United States Patent [19]
Lagoni et al.

[11] Patent Number: 5,847,773
[45] Date of Patent: *Dec. 8, 1998

[54] VIDEO SYSTEM INCLUDING APPARATUS FOR DEACTIVATING AN AUTOMATIC CONTROL ARRANGEMENT

[75] Inventors: William Adamson Lagoni; Robert Lawrence O'Brien, both of Indianapolis, Ind.

[73] Assignee: Thomson Consumer Electronics, Inc., Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 582,404

[22] Filed: Jan. 3, 1996

Related U.S. Application Data

[63] Continuation of Ser. No. 416,588, Apr. 3, 1995, abandoned, which is a continuation of Ser. No. 109,208, Aug. 19, 1993, abandoned, which is a continuation-in-part of Ser. No. 751,810, Aug. 30, 1991, abandoned.

[51] Int. Cl.$^6$ .............................. H04N 5/57; H04N 5/58
[52] U.S. Cl. ............................................ 368/603; 348/687
[58] Field of Search ..................................... 348/541, 602, 348/603, 604, 686, 687, 678, 708; 455/234, 245; H04M 5/57, 5/58

[56] References Cited

U.S. PATENT DOCUMENTS

| | | | |
|---|---|---|---|
| 3,804,981 | 4/1974 | Avins | 178/7.3 R |
| 3,983,575 | 9/1976 | Nagai | 358/161 |
| 4,067,517 | 1/1978 | Barnum | 244/17.13 |
| 4,167,025 | 9/1979 | Willis | 358/243 |
| 4,355,334 | 10/1982 | Fitzgibbon | 358/168 |
| 4,549,217 | 10/1985 | Sendelweck | 358/243 |
| 4,549,218 | 10/1985 | Norley et al. | 358/243 |
| 4,682,231 | 7/1987 | Yamakawa | 358/169 |
| 4,730,211 | 3/1988 | Hasegawa | 358/64 |
| 4,760,450 | 7/1988 | Yagi | 358/170 |
| 4,947,253 | 8/1990 | Neal | 358/168 |
| 4,980,756 | 12/1990 | Lagoni | 358/39 |
| 4,982,287 | 1/1991 | Lagoni | 358/168 |
| 5,003,394 | 3/1991 | Lagoni | 358/168 |
| 5,040,065 | 8/1991 | Vilard | 358/169 |
| 5,131,381 | 7/1992 | Ams et al. | |

FOREIGN PATENT DOCUMENTS

| | | | |
|---|---|---|---|
| A0424721 | 5/1991 | European Pat. Off. | H04N 5/235 |

*Primary Examiner*—Robert Chevalier
*Attorney, Agent, or Firm*—Joseph S. Tripoli; Peter M. Emanuel; Paul P. Kiel

[57] ABSTRACT

A projection television system includes an automatic contrast control section for controlling the amplitude of the luminance signal in response to the peak value of a luminance-representative image component signal in order to prevent white-spot blooming. Circuitry is provided for deactivating the automatic contrast control section when a user sets the contrast control level above a given threshold level, e.g., corresponding to the maximum contrast control level. As a result white-spot blooming is inhibited in order to ensure sharp images for a contrast control range below the given threshold level while allowing maximum white image components to be produced (at the expense of white spot blooming) when the contrast control level is set above the threshold level, depending on the preference of the user.

19 Claims, 3 Drawing Sheets

VIDEO SYSTEM INCLUDING APPARATUS FOR DEACTIVATING AN AUTOMATIC CONTROL ARRANGEMENT

This is a continuation of application Ser. No. 08/416,588, filed Apr. 3, 1995 now abandoned, which is a continuation of application Ser. No. 08/109,208, filed Aug. 19, 1993 now abandoned, which cip of Ser. No. 07/751,810 filed Aug. 30, 1991 abn.

FIELD OF THE INVENTION

The present invention concerns apparatus for defeating an automatic control arrangement used in a television system and, more particularly, apparatus for defeating the automatic control arrangement as a function of the user control setting.

BACKGROUND OF THE INVENTION

In modern television receivers, it is desirable to prevent "white spot blooming", e.g., by automatically controlling the contrast of the reproduced image. Typically, the contrast is controlled by an automatic beam current limiting system which senses the beam current drawn by the picture tube and reduces the contrast when the beam current exceeds a predetermined level of beam current. Such a system is described in U.S. Pat. No. 4,167,026, entitled "Automatic Beam Current Limiter" issued on Sep. 4, 1979 to D. H. Willis. The contrast may also be controlled by an automatic white peak control system which senses the peak amplitude of a video signal, such as the luminance signal, and reduces the contrast when the amplitude of the video signal exceeds a predetermined threshold level. The white peak responding automatic contrast control apparatus inhibits spot blooming when the image contains excessively large white peaks in small areas corresponding, e.g., to informational characters or text provided by a television studio or other source such as a VCR with an "on-screen" display feature. Such a system is described in U.S. Pat. No. 4,980,756, entitled "Control Signal Generator for a Television System", issued on Dec. 25, 1990 to W. A. Lagoni.

It is recognized that contrast reduction may reduce the contrast and subjective brightness of the reproduced image. More specifically, it is recognized that while it is desirable to provide automatic contrast control to reduce the amplitude of the luminance signal when the reproduced image includes white-going peaks exceeding a predetermined level corresponding, e.g., to characters, mid-range luminance amplitudes will also be reduced. This results in a contrast and subjective brightness reduction. In order to overcome the above-noted problems, it is known to employ a non-linear amplitude control section which is coupled in cascade with a contrast control unit to dynamically emphasize mid-range amplitude luminance levels relative to high amplitude luminance levels as a function of the average value of the luminance signal. As a result, for images containing excessive white-going peaks but having a low average luminance level, the amplitudes of the white-going peaks are decreased while the amplitudes of mid-range luminance levels are simultaneously increased. In this way, "white spot blooming" (as well as picture tube phosphor and driver saturation) is minimized while subjectively sharp, bright images are provided. Such a system is described in detail in U.S. Pat. No. 5,003,394 entitled "Dynamic Video System Including Automatic Contrast and White-Stretch Processing Sections" issued on Dec. 25, 1990 to W. A. Lagoni.

SUMMARY OF THE INVENTION

While the dynamic video system referred to above is effective to inhibit spot blooming due to excessive peak white signals without unduly effecting mid-level luminance signals, in certain instances, the automatic contrast control apparatus may operate to restrict the maximum achievable operation of the system. For example, in a projection television system an arrangement for automatically reducing contrast may under certain circumstances operate in a manner which is contrary to the desire of a user that maximum light output be produced at the maximum contrast setting. Viewed another way, a user who purchases a projection system may not be particularly concerned with spot blooming but may be instead concerned that the projection television system operate to provide maximum light output at the maximum contrast setting.

According to an aspect of the invention, in order to operate a television system in accordance with the preferences of the user, apparatus is provided for sensing the contrast control setting, and dependent upon the setting, for deactivating the automatic contrast control apparatus when the setting is at or beyond a predetermined level, e.g., corresponding to the maximum contrast setting. In this manner, the maximum light output of the display will not be limited by the automatic contrast control section.

According to another aspect of the invention, circuitry is provided for deactivating an automatic control apparatus such as automatic contrast control apparatus. This circuitry includes a sensing element for generating a signal representing the actual user control level, such as the contrast control level, independently of that generated by the interaction of the user contrast control apparatus and the automatic control apparatus, and a comparator element for determining when the user control level representative signal reaches a predetermined threshold.

These and other aspects of the invention will be described in detail below in connection with the accompanying Drawings.

BRIEF DESCRIPTION OF THE DRAWINGS

In the various Figures, the same or similar components are identified by the same reference numbers.

DETAILED DESCRIPTION OF THE INVENTION

Figure 1:
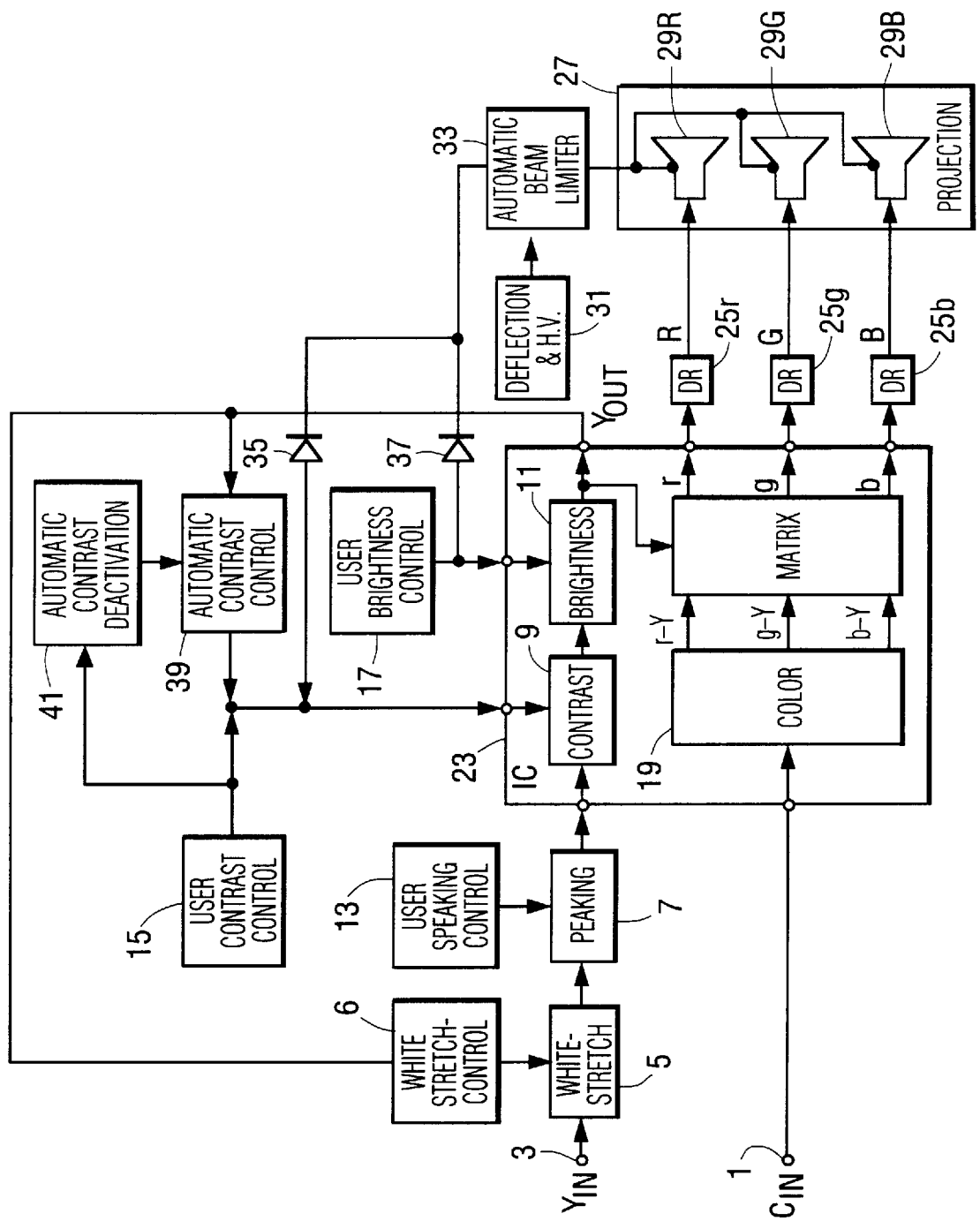
FIG. 1 shows a block diagram of a typical projection-type television system in which the present invention is employed.

In the television system shown in FIG. 1, separated luminance ($Y_{IN}$) and chrominance ($C_{IN}$) signal components derived by, e.g., a comb filter (not shown), from a composite video signal are coupled to respective input terminals 1 and 3 of a video signal processing section where they are processed in order to reproduce an image.

The luminance input signal component ($Y_{IN}$) is processed in a cascade of luminance processing sections including a "white-stretch" section 5, a peaking section 7, a contrast section 9 and a brightness section 11 to produce a processed luminance output signal ($Y_{OUT}$). Briefly, white-stretch section 5 provides a non-linear gain control function which amplifies relatively low amplitude portions of the luminance signal more than relatively high amplitude portions of the luminance signal. In the television system shown in FIG. 1, the white-stretch function is dynamically controlled in response to the average level of the processed luminance output signal ($Y_{OUT}$). For this purpose, a white-stretch control voltage for white-stretch section 5 is generated by a white-stretch control unit 6 in response to the processed luminance output signal $Y_{OUT}$. The function and operation of white-stretch section 5 and white-stretch control unit 6 are described in detail in U.S. Pat. No. 5,003,394 referred to above. Peaking, contrast and brightness sections 7, 9 and 11 are of conventional design and function as is known in the television field to to respectively control the high frequency content of the luminance output signal ($Y_{OUT}$) corresponding to the sharpness of image transitions or edges, the amplitude of $Y_{OUT}$ corresponding to image contrast, and the DC component of $Y_{OUT}$ corresponding to image brightness.

Figure 2:
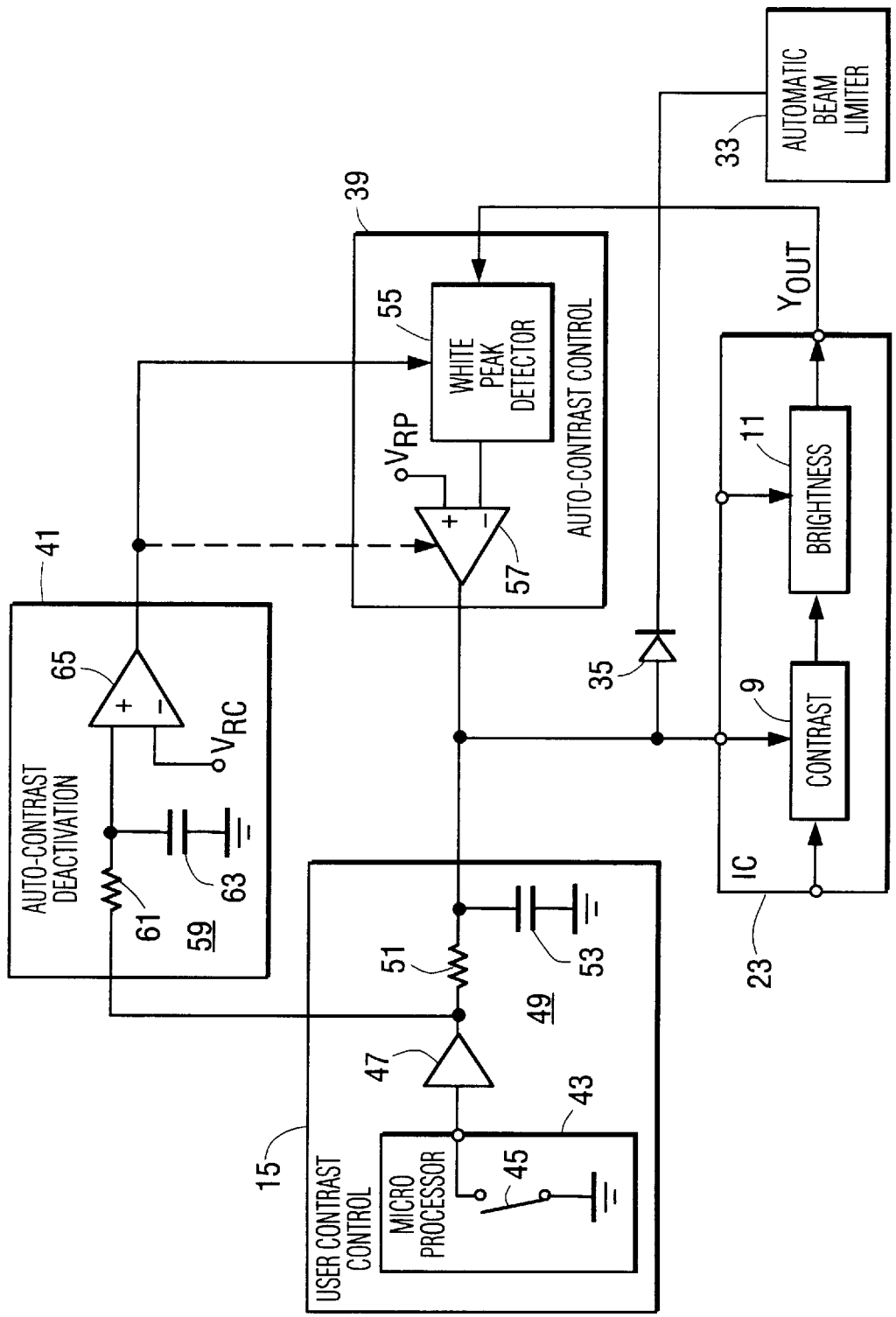
FIG. 2 shows a schematic diagram indicating circuit implementations of certain portions of the television system shown in FIG. 1 with which the invention is particularly concerned.
Figure 3:
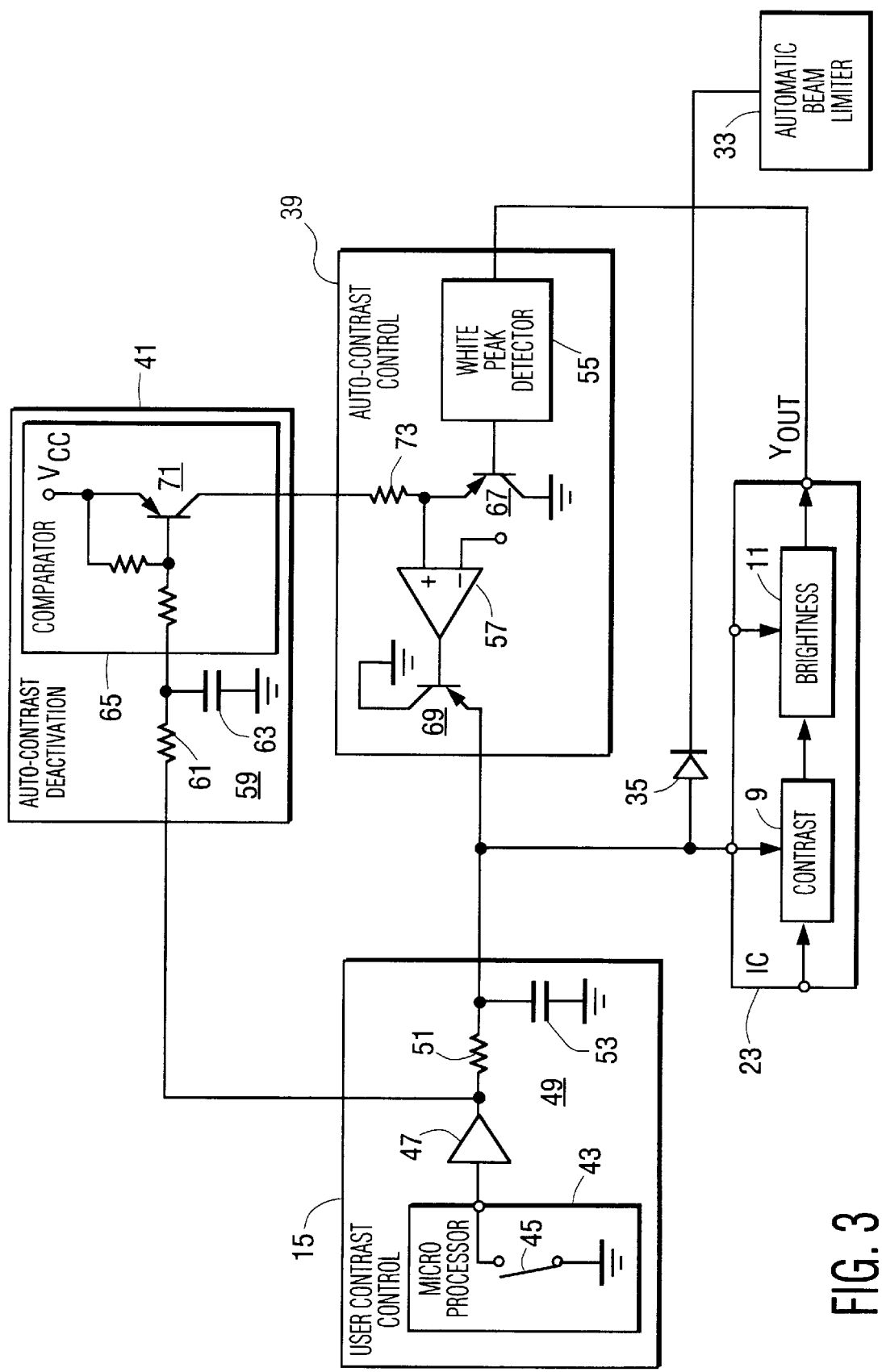
FIG. 3 shows a schematic diagram indicating circuit implementations of additional portions of the television receiver shown in FIG. 1 with which the invention is particularly concerned.

Peaking, contrast and brightness user control units 13, 15 and 17 are provided to allow a user to manually adjust the respective characteristics of the image. Each of the user control units 13, 15 and 17 produces a DC control voltage for a respective luminance processing section, and for that purpose may include a respective potentiometer. Alternately, as is more conventional in modern television systems, each user control unit may include a respective digital-to-analog converter controlled by a microprocessor, as is shown in FIGS. 2 and 3. The microprocessor receives user initiated commands corresponding to the image characteristics from a keyboard. The keyboard may be mounted on a remote control transmitter.

The chrominance input signal component ($C_{IN}$) is processed by a color processing section 19 including a color demodulator, a saturation (amplitude) processing unit (not shown) and a tint or hue (phase) processing unit (not shown) to produce low level red, green and blue color difference signals (r-Y, g-Y and b-Y). Alternately, the color difference signals may be of the I and Q type. The saturation and tint processing may be manually and/or automatically controlled by elements not shown. The color difference signals(r-Y, b-Y and g-Y), and the processed luminance output signal ($Y_{OUT}$) are coupled to a matrix 21 where they are combined to produce low level red, green and blue color signals (r, g and b).

Portions of the television system, such as contrast brightness, color processing sections 9, 11 and 19 and matrix 21, may be included within a single integrated circuit (IC) indicated by block 23. Various signal input and output terminals are indicated by the small circles.

The low level r, g and b color signals are amplified by respective drive amplifiers (DR) 25r, 25g and 25b to produce high level R, G and B color signals suitable for driving a display device 27 such as a projection arrangement comprising individual red, green and blue picture tubes 29R, 29G, and 29B, projection optics (not shown) and a screen (not shown). While the invention is described with reference to a projection-type television system, it is applicable to a direct view television system as well. In the direct view case, the high level R, G and B color signals are coupled to respective cathodes of a common picture tube.

Although not shown for the sake of simplicity, the television system also includes a synchronization processing section for deriving horizontal and vertical synchronization pulses contained in the luminance input signal ($Y_{IN}$). The synchronization pulses are processed by a deflection and high voltage section 31 to produce deflection signals for the picture tubes 29R, 29G and 29B, as well as the necessary ultor operating voltages. The synchronization pulses are also processed to derive horizontal and vertical retrace blanking pulses which are inserted, e.g., within matrix 21, into the respective retrace intervals of the low level r, g and b signals so that display device 24 will be "blanked" during horizontal and vertical retrace intervals in order to avoid producing visible retrace lines.

As previously indicated, it is desirable to limit the electron beam current in order to avoid "white spot blooming". Typically, this is accomplished by sensing the average current drawn by the picture tube or tubes from the associated high voltage power supply and generating a beam current control voltage for reducing one or both of the contrast and brightness of the reproduced image. In the television system shown in FIG. 1, this is accomplished by beam current limiter unit 33 which may be arranged in the manner disclosed in U.S. Pat. No. 4,167,025 entitled "Automatic Peak Beam Current Limiter" by D. H. Willis issued on Sep. 4, 1979 referred to above. Typically, the beam current limiting operation is a sequential operation in which contrast is reduced first and thereafter brightness is reduced, either together with contrast or by itself. The levels at which the contrast and brightness are reduced are determined by threshold devices, represented by FIG. 1 by diodes 35 and 37, which are coupled between the beam current limiter unit 33 and the respective contrast and brightness control inputs of IC 23. Diodes 35 and 37 are normally non-conductive and are rendered conductive when the beam current control voltage generated by beam current limiter 33 falls below, by approximately 0.7 volts, the contrast and brightness control voltages, respectively. Once one of diodes 35 and 37 is conductive, the respective image characteristic is reduced in response to the beam current control signal.

In addition to the beam current limiting function provided by the beam current limiter 33, the peak drive level for picture tubes 29R, 29G and 29B is limited to a predetermined value since electron beam spot size expands non-linearly at higher beam current amplitudes. Specifically, as will be described in greater detail with reference to FIG. 3, this is accomplished by an automatic contrast control unit 39 which senses the instantaneous peak amplitude of the processed luminance output signal, $Y_{OUT}$, produced by the cascade of peaking, contrast, and brightness processing sections 7, 9 and 11, to generate an automatic contrast control voltage. The processed luminance output signal, $Y_{OUT}$, is utilized, rather than the unprocessed luminance input signal, $Y_{IN}$, since $Y_{OUT}$ is influenced by the peaking, contrast and brightness user controls. This type of automatic contrast control (which also may be called "auto-pix", "pix" being an abbreviation for "picture"), prevents loss of detail sharpness in highlight (white) areas due to blooming, while permitting high contrast (and therefore subjectively bright) images when the signal peaks are below the blooming threshold. This type of automatic contrast control arrangement is described in detail in U.S. Pat. No. 4,980,756, entitled "Control Signal Generator for a Television System" issued on Dec. 25, 1990 to W. A. Lagoni referred to above.

According to an aspect of the invention, apparatus for deactivating the "auto-pix" function when the user increases the user contrast control setting beyond a threshold corresponding to maximum contrast is also provided. More specifically, the television system shown in FIG. 1 includes a unit 41 which is coupled between user contrast control unit 15 and automatic contrast control unit 39 for deactivating or disabling the automatic contrast or "auto-pix" function when the user desires to set the contrast control to operate the television system with maximum light output. As indicated above, in a projection television system, as for example shown in FIG. 1, a user may find it desirable that the projection television system provide maximum light output at the maximum customer contrast control setting in spite of the possibility of defocussing due to spot blooming. It is of course possible to completely omit the automatic contrast control apparatus from the projection television system to ensure that maximum light output will be produced at the maximum contrast control setting. However, that would mean that the anti-spot blooming benefits of the automatic contrast control apparatus would not be available at any contrast control setting. Thus, in order to maintain picture sharpness at normal contrast settings, it is desirable to sense the user contrast control setting and selectively deactivate the automatic contrast control function as a function of the user control setting. As one skilled in the art will appreciate, there are many ways of defeating the automatic contrast control function, some of which will be described with reference to FIGS. 2 and 3.

In the arrangement shown in FIG. 2, the contrast control unit 15 comprises a digital-to-analog (D/A) converter which produces an analog DC control signal in response to digital control words. The D/A converter includes a common control microprocessor 43 which is used to control various functions such as peaking, contrast and brightness. A pulse signal, including pulses encoded in pulse width or binary rate modulated fashion to represent the contrast control setting, is generated by a switching element represented by switch 45 under the control of microprocessor 43 and is coupled to the input of a buffer amplifier 47. The output of buffer amplifier 47 is coupled to a low pass filter 49 represented by a series-connected resistor 51 and a shunt-connected capacitor 53. Filter 49 filters the pulse signal produced by amplifier 47 to produce the DC user contrast control voltage. For the embodiment shown, it is assumed that white-going portions of the processed luminance output signal $Y_{OUT}$ are positive-going, that increasing the DC contrast control signal corresponds to increasing gain, and therefore increasing contrast, and that decreasing the contrast control signal corresponds to decreasing gain and contrast.

As shown in FIG. 2, automatic contrast control unit 39 includes a peak detector 55 which detects the peaks of the white-going portion of the processed luminance output signal $Y_{OUT}$. The DC output voltage of white peak detector 55 is coupled to one input of an amplifier/comparator 57. A reference voltage, $V_{RP}$, corresponding to the peak level beyond which blooming is likely to occur is coupled to the other input of amplifier/comparator 57. Peak detector 55 and amplifier/comparator 57 are arranged to decrease the contrast control voltage as a function of the peak amplitude of the luminance output signal when the peak exceeds the reference voltage $V_{RP}$.

In the arrangement shown in FIG. 2, just as shown in FIG. 1, automatic beam current limiter 33 is coupled to contrast section 9 via diode 35.

Capacitor 53 of low pass filter 49 is shared to filter and store the respective control voltages generated by user contrast control unit 15, automatic beam current limiter 33 and automatic contrast control unit 41. The control voltage developed across capacitor 53 is a combination of the individual control voltages generated by control units 15, 33 and 41.

As shown in FIG. 2, automatic contrast control deactivation unit 41 includes another low pass filter 59, comprising a series-connected resistor 61 and a shunt-connected capacitor 63 coupled to the output of buffer amplifier 47, for deriving a DC voltage corresponding to the actual manual contrast control setting set by the user. It will be noted that the contrast control voltage developed across capacitor 53 of low pass filter 49 does not correspond to the actual manual contrast control setting set by the user since it is produced as a result of the interaction of user contrast control unit 15 with automatic contrast control unit 39 and beam current limiter 33. Desirably, buffer amplifier 47 is a low output impedance amplifier, such as an emitter-follower amplifier, so as to aid in isolating low pass filter 59 from low pass filter 49. The DC voltage produced by filter 59 is coupled to one input of a comparator 65. A reference voltage, $V_{RC}$, corresponding to the contrast control setting at which automatic contrast control unit 39 is to be deactivated, is coupled to the other input of comparator 65. In the preferred embodiment of the invention, reference voltage $V_{RC}$ corresponds to the maximum contrast setting. The output of comparator 65 is coupled to automatic contrast control unit 39. As is indicated in FIG. 2 by the dashed lines, the output of comparator 39 may be coupled to various portions of automatic contrast control unit 39 to disable its operation. Thus, for example, the output of comparator 65 may be coupled to peak detector section 55 or to amplifier/comparator section 57.

When the DC voltage produced at the output of low pass filter 59 (representing the user's desired contrast control setting exceeds reference voltage $V_{RC}$), comparator 65 generates a signal for deactivating automatic contrast control unit 39. If reference voltage $V_{RC}$ corresponds to the maximum contrast setting, automatic contrast control unit 39 will be disabled at the maximum contrast setting. If reference voltage $V_{RC}$ corresponds to a contrast setting lower than the maximum contrast setting, automatic contrast control unit 39 will be disabled at the lower level and contrast control will be available without interference from automatic contrast control 39 in a range corresponding to the voltage difference between reference voltage $V_{RC}$ and the maximum user contrast control voltage. In this manner, the television system will operate without peak-white spot blooming due to the functioning of automatic contrast control unit 39 over a first contrast control range, and is capable of operating so as to produce dramatic peak white image components (without limitation due to automatic contrast control unit 39) if the contrast is adjusted in a second control range beyond the first contrast control range.

As previously indicated, the automatic contrast control function can be disabled in many different ways. One way is to prevent the processed luminance output signal ($Y_{OUT}$) from being coupled to white peak detector 55. Another way is to alter (raise) reference voltage $V_{RP}$ for automatic contrast control comparator/amplifier 57. Still another way is to prevent the control voltage generated at the output of comparator/amplifier 57 from being coupled to contrast section 9 of IC 27. Still another way is to prevent the output signal of peak detector section 55 from being coupled to comparator/amplifier 57. FIG. 3 shows a schematic diagram of an arrangement with an implementation of this technique.

In the arrangement shown in FIG. 3, PNP transistors 67 and 69 configured as emitter-follower amplifiers are coupled as buffers to respective outputs of white peak detector 55 and comparator/amplifier 57 of automatic contrast control unit 39. Comparator 65 of automatic contrast deactivation unit 41 comprises a PNP transistor 71 having its base electrode coupled to the output of low pass filter 59, its emitter electrode connected to a source of operating potential ($+V_{CC}$) and its collector electrode connected to one end of a resistor 73. The other end of resistor 73 is connected to the emitter electrode of emitter-follower configured PNP transistor 67 which is connected to the output of white peak detector 55 of automatic contrast control unit 55. Resistor 73 and the collector-emitter conduction path of transistor 71 serve as the emitter-load impedance of emitter-follower configured PNP transistor 67.

In operation, transistor 71 is normally conductive and therefore provides a path for the emitter current of emitter-follower configured transistor 67. Therefor, transistor 67 is conductive and the output signal of white peak detector 55 is coupled to comparator 57. Transistor 71 is rendered non-conductive when the voltage at the base electrode of transistor 71 is approximately equal to the voltage at the emitter electrode. In the implementation shown in FIG. 3, supply voltage $+V_{CC}$ approximately corresponds to the maximum contrast control setting. When transistor 71 is rendered non-conductive, the path for the emitter current of emitter-follower configured PNP transistor 67 is interrupted and the output of white peak detector 55 is decoupled from the input of comparator/amplifier 57. Therefore the operation of automatic contrast control 39 is disabled.

Various modifications to the described embodiment have been indicated at appropriate places in the above description. It should be appreciated that various other modifications can be made by persons skilled in the art. For example, the user contrast control setting can be determined from a digital word representing the contrast setting stored in a microprocessor. Further, while the automatic contrast control arrangement in the described embodiment is responsive to the peak amplitude of a video signal, the invention is also applicable to other automatic contrast control arrangements. Additionally, while the video processing section of the television system shown in FIG. 1 is arranged to perform the white stretch, peaking, contrast and brightness control functions on the luminance signal, one or more of these functions may be performed individually on red, green and blue color signals. The TA7730 IC available from Toshiba Corporation, which performs the contrast and brightness functions on red, green and blue color signals, is suitable for that purpose. The TA7730 IC also produces a luminance representative signal, which is suitable for the automatic contrast control function, as well as the white stretch control function, by combining the processed red, green and blue color signals. These and other modifications are intended to be within the scope of the invention defined by the following claims.

We claim:

1. Apparatus comprising:
   a channel for processing an information bearing signal including means for continuously controlling a characteristic of said information bearing signal in response to a control signal;
   means subject to a user's manual adjustment and responsive to said information bearing signal for generating a combined control signal representing both a manual control level and an automatic control level in combined form;
   said means for coupling said combined control signal to said controlling means; and
   means subject to the user's manual adjustment for generating an auxiliary control signal representative of said manual control level independent of said automatic control level; wherein:
      said means for generating said combined control signal includes means for generating a pulse signal encoded to represent said manual control level; means for generating an automatic control signal in response to said information bearing signal; and a common filter element for filtering both of said pulse signal and said automatic control signal to produce said combined control signal; and
   said auxiliary control signal generating means includes another filter element for filtering said pulse signal to produce said auxiliary control signal.

2. The apparatus recited in claim 1, further including:
   means responsive to said auxiliary control signal for modifying the operation of said means for generating said automatic control signal when said manual control level reaches a predetermined threshold.

3. Apparatus, comprising:
   a channel for processing an information bearing signal including means for controlling a characteristic of said information bearing signal in response to a control signal;
   means responsive to a user's manual adjustment for generating a manual control signal;
   means for comparing said manual control signal to a reference level corresponding to a particular manual adjustment level and for generating a switching control signal when said manual control signal exhibits a predetermined relationship to said reference level;
   means responsive to said information bearing signal for generating an automatic control signal in a first mode of operation;
   means responsive to said switching control signal for switching said automatic control signal generating means from said first mode of operation to a second mode of operation;
   means for coupling said manual control signal independent of said comparing means to said controlling means so that said controlling means controls said characteristic of said information bearing signal in response to said manual control signal; and
   means for coupling said automatic control signal to said controlling means so that said controlling means controls said characteristic of said information bearing signal in response to said automatic control signal.

4. The apparatus recited in claim 3, wherein:
   said automatic control signal generating means is disabled from generating said automatic control signal in said second mode of operation.

5. The apparatus recited in claim 4, wherein:
   said means for coupling said manual control signal couples said manual control signal to said controlling means so that said controlling means continues to be responsive to said manual control signal when said means for generating said automatic control signal is in said second mode of operation.

6. The apparatus recited in claim 3, wherein:
   said processing channel is included in a television system, said information bearing signal is a video signal, and said controlling means controls an amplitude characteristic of said video signal.

7. The apparatus recited in claim 6, wherein:
   said controlling means controls the peak amplitude of said video signal in order to control a contrast characteristic of an image reproduced in response to said video signal; and
   said means for generating said automatic control signal is responsive to the peak amplitude of said video signal; and said means for generating said manual control signal comprises a manual contrast control arrangement.

8. The apparatus recited in claim 7, wherein:

said reference level corresponds to a particular contrast control level.

9. In a television system, apparatus comprising:

a video channel for processing a video signal including means for controlling an amplitude characteristic of said video signal in response to a control signal;

a display arrangement including at least one picture tube for reproducing an image in response to said video processed by said video channel, said display arrangement drawing a beam current in response to said video signal;

means responsive to a user's manual adjustment for generating a manual control signal;

means for comparing said manual control signal to a reference level corresponding to a particular manual adjustment level and for generating a switching control signal when said manual control signal exhibits a predetermined relationship to said reference level;

means responsive to said video signal for generating an automatic control signal, in a first mode of operation, for limiting said beam current drawn by said display arrangement;

means responsive to said switching control signal for switching said automatic control signal generating means from said first mode of operation to a second mode of operation;

means for coupling said manual control signal independent of said comparing means to said controlling means so that said controlling means controls said amplitude characteristic of said video signal in response to said manual control signal; and means for coupling said automatic control signal to said controlling means so that said controlling means controls said amplitude characteristic of said video signal in response to said automatic control signal.

10. The apparatus recited in claim 9, wherein:

said means for coupling said manual control signal couples said manual control signal to said controlling means so that said controlling means continues to be responsive to said manual control signal when said automatic control signal generating means is in said second mode of operation.

11. The television system recited in claim 10, wherein:

said beam current limiting means includes means responsive to the average value of said beam current; and means responsive to the peak value of said video signal.

12. The television system recited in claim 11, wherein:

said means for switching switches said automatic control signal generating means from said first mode to said second mode disabling the operation of said means responsive to said peak value of said video signal when said manual control signal and said reference level exhibit said predetermined relationship.

13. The television system recited in claim 11, wherein:

said means for switching switches said automatic control signal generating means from said first mode to said second mode disabling said means responsive to said peak value of said video signal but does not disable said means responsive to said average beam current when said manual control signal and said reference level exhibit said predetermined relationship.

14. The television system recited in claim 13, wherein:

said controlling means controls the peak amplitude of said video signal in order to control a contrast characteristic of said image reproduced in response to said video signal; and said means for generating said manual control signal comprises a manual contrast control arrangement.

15. The television system recited in claim 14, wherein:

said reference level corresponds to the particular contrast control level.

16. The television system recited in claim 15, wherein:

said display arrangement comprises a projection system including three picture tubes.

17. In a television system, apparatus comprising:

a video channel for processing a video signal including means for controlling a peak amplitude of said video signal in response to a control signal;

a display arrangement including at least one picture tube for reproducing an image in response to said video signal processed by said video channel, said display arrangement drawing a beam current in response to said video signal;

means responsive to a user's manual adjustment for generating a manual control signal representative of a desired level of image contrast;

means for comparing said manual control signal to a reference level corresponding to a particular image contrast level and for generating a second control signal when said manual control signal exhibits a predetermined relationship to said reference level;

means responsive to said video signal for generating an automatic control signal, in a first mode of operation, for limiting said beam current drawn by said display arrangement;

means responsive to said second control signal for switching said automatic control signal generating means from said first mode of operation to a second mode of operation;

means for coupling said manual control signal independent of said comparing means to said controlling means so that said controlling means controls said peak amplitude characteristic of said video signal in response to said manual control signal; and means for coupling said automatic control signal to said controlling means so that said controlling means controls said peak amplitude characteristic of said video signal in response to said automatic control signal.

18. The television system recited in claim 17, wherein:

said automatic control signal generating means includes means responsive to the average value of said beam current; and means responsive to said peak value of said video signal; and said means for switching switches said automatic control signal generating means from said first mode to said second mode disabling the operation of said means responsive to said peak amplitude of said video signal when said manual control signal corresponds to said particular image contrast level.

19. The television system recited in claim 18, wherein:

said display arrangement comprises a projection system including three picture tubes.

* * * * *